(12) United States Patent
Abrami et al.

(10) Patent No.: US 10,831,631 B2
(45) Date of Patent: Nov. 10, 2020

(54) CONTINUOUS TIME ALIGNMENT OF A COLLECTION OF INDEPENDENT SENSORS

(71) Applicant: INTERNATIONAL BUSINESS MACHINES CORPORATION, Armonk, NY (US)

(72) Inventors: Avner Abrami, New York, NY (US); Stephen J. Heisig, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

(21) Appl. No.: 16/022,553

(22) Filed: Jun. 28, 2018

(65) Prior Publication Data

US 2020/0004655 A1    Jan. 2, 2020

(51) Int. Cl.
| | | |
|---|---|---|
| *G06F 15/173* | (2006.01) | |
| *G06F 11/30* | (2006.01) | |
| *G06K 9/62* | (2006.01) | |
| *H04L 29/08* | (2006.01) | |
| *G06N 20/00* | (2019.01) | |

(52) U.S. Cl.
CPC ........ *G06F 11/3089* (2013.01); *G06K 9/6267* (2013.01); *G06N 20/00* (2019.01); *H04L 67/10* (2013.01)

(58) Field of Classification Search
CPC ..... G06F 19/345; G06F 19/00; G06N 99/005; G06N 20/10; G06N 20/20; G06N 20/00; G06N 99/00; G16H 50/20
See application file for complete search history.

(56) References Cited

U.S. PATENT DOCUMENTS

| | | | | |
|---|---|---|---|---|
| 2013/0238538 | A1* | 9/2013 | Cook | G05B 15/02 706/20 |
| 2014/0057572 | A1* | 2/2014 | Klinghult | G01C 25/00 455/67.11 |
| 2015/0127284 | A1* | 5/2015 | Seshan | G01D 3/022 702/89 |
| 2015/0339570 | A1 | 11/2015 | Scheffler | |
| 2016/0314255 | A1* | 10/2016 | Cook | G06N 20/10 |
| 2016/0371376 | A1* | 12/2016 | Hassan | G06K 9/00536 |
| 2017/0160328 | A1* | 6/2017 | Pal | G01R 31/088 |
| 2017/0206464 | A1* | 7/2017 | Clayton | G06N 3/0454 |
| 2017/0208151 | A1 | 7/2017 | Gil et al. | |

(Continued)

OTHER PUBLICATIONS

Su et al., "Augmenting Film and Video Footage with Sensor Data," Proceedings of the Second IEEE Annual Conference on Pervasive Computing and Communications, 2004 (10 pages).

(Continued)

*Primary Examiner* — Cheikh T Ndiaye
(74) *Attorney, Agent, or Firm* — Griffiths & Seaton PLLC

(57) ABSTRACT

Embodiments for continuous time alignment of a collection of independent sensors monitoring a common entity by one or more processors. One or more activity events associated with a monitored entity may be identified in the time series sensor data collected from a plurality of sensors. The one or more activity events may be dynamically characterized in the time series sensor data using a machine learning operation. The time series data streams from each of the plurality of sensors may be time-aligned by aligning the one or more activity events.

20 Claims, 9 Drawing Sheets

(56) References Cited

U.S. PATENT DOCUMENTS

2018/0168515 A1\* 6/2018 Farahmand .............. G06N 5/04
2019/0195635 A1\* 6/2019 Shu ........................ G01C 21/14

OTHER PUBLICATIONS

Scheffler, "NeurOS and NeuroBlocks a neural/cognitive operating system and building blocks," Biologically Inspired Cognitive Architectures, 11, 2015 (31 pages).

Farrar et al., "Coupling sensing hardware with data interrogation software for structural health monitoring," Shock and Vibration 13, 2006 (13 pages).

Bezawada, "Onboard Aircraft Traffic Tracking Algorithm to Support Conflict Detection and Resolution using Multi-sensor Data Integration and Integrity Monitoring," Diss. Ohio University, 2012 (141 pages).

Guerra, "Studies of ambient noise in shallow water environments off Mexico and Alaska: characteristics, metrics and time-synchronization applications," University of California, San Diego Diss, Jan. 1, 2013 (184 pages).

\* cited by examiner

CONTINUOUS TIME ALIGNMENT OF A COLLECTION OF INDEPENDENT SENSORS

BACKGROUND OF THE INVENTION

Field of the Invention

The present invention relates in general to computing systems, and more particularly to, various embodiments for continuous time alignment of a collection of independent sensors monitoring a common entity by one or more processors.

Description of the Related Art

In today's society, consumers, businesspersons, educators, and others communicate over a wide variety of mediums in real time, across great distances, and many times without boundaries or borders. Current network and communications technologies, such as machine-to-machine (M2M) technologies and the Internet, allow devices to communicate and interact more directly with each other and even monitor activities of daily living ("ADL") using various computing technology.

SUMMARY OF THE INVENTION

Various embodiments for continuous time alignment of time series data from a collection of independent sensors monitoring a common entity by one or more processors, are provided. In one embodiment, by way of example only, a method for continuous time alignment of time series data from a collection of independent sensors monitoring a common entity in an internet of things (IoT) computing environment, again by one or more processors, is provided. One or more activity events associated with a monitored entity may be identified in time series sensor data collected from a plurality of sensors. The one or more activity events may be dynamically characterized in the time series sensor data using a machine learning operation. The time series data streams from each of the plurality of sensors may be time-aligned by aligning the one or more activity events.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a flowchart diagram depicting an exemplary method for training a machine learning classifier for performing continuous time alignment of a collection of independent sensors monitoring a common entity by one or more processors in which aspects of the present invention may be realized.

DETAILED DESCRIPTION OF THE DRAWINGS

Figure 1:
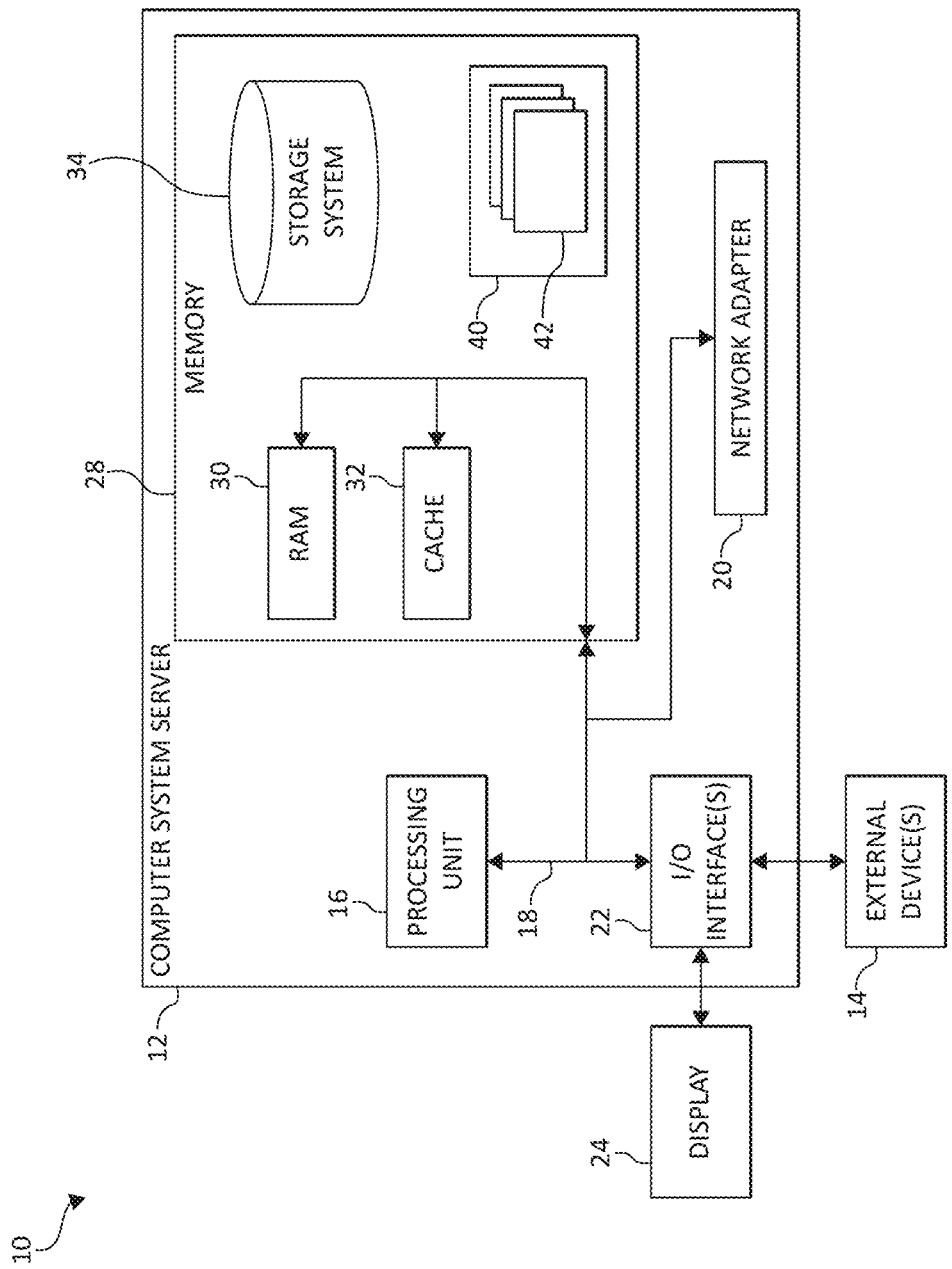
FIG. 1 is a block diagram depicting an exemplary computing node according to an embodiment of the present invention.

As a preliminary matter, computing systems may include large scale computing called "cloud computing," in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

The Internet of Things (IoT) is an emerging concept of computing devices that may be embedded in objects, especially appliances, and connected through a network. An IoT network may include one or more IoT devices or "smart devices", which are physical objects such as appliances with computing devices embedded therein. Examples of network-enabled appliances or devices may include computers, smartphones, laptops, wearable devices, sensor devices, voice-activated devices, face-activated devices, digital assistants, home appliances, audio systems, televisions, security cameras, security sensors, among countless other examples. Such IoT computing systems may be employed in a variety of settings.

For example, sensors (e.g., IoT sensor devices and non-IoT sensors) may be used to monitor people, places and objects. There are many different types of sensors, including, for example, wearable sensors that keep track of the health of the wearer (e.g., a heart rate monitor or an electrocardiogram (ECG) sensor). Sensors can also be used to keep track of environmental conditions such as temperature, humidity, moisture, pressure, wind, and the like. Recent advances in sensor, electronics, and power source miniaturization have allowed the size of sensor devices, also to be offered to monitor, for example, an entity (e.g., a human). That is, a sensor may be configured to monitor activities and/or parameters associated with a person's health, fitness and/or level of physical performance in various physical activities.

For example, people involved in various levels of routine exercise can monitor the progress of their development and determine possible changes or enhancements to their routines. Persons active in a particular sport, whether at a casual level or up through a professional level, can monitor the development of their performance in various activities related to that sport. Also, monitoring health and fitness related characteristics of a person can be helpful when the person is recovering from surgery or an injury.

In an additional aspect, a person suffering from a disease or sickness may have a need to monitor one or more activities (e.g., motor functions). For example, Parkinson's disease ("PD") is a neurodegenerative disease affecting over a million people in the United States and which has rapidly growing social and economic impacts. Bradykinesia (slowness of movement), rigidity (stiffness and resistance to passive movement), tremor, and gait and balance difficulties are all symptoms of the disease's impact on the body. Often, monitoring quantities associated with a person's health, fitness, and/or level of performance can be one or more of inconvenient, costly, or otherwise challenging.

Thus, the present invention seeks to develop a system to passively capture data from people continuously in their daily life such as, for example, a patient with PD. Moreover, the present invention aims to create analytics to monitor an entity (e.g., a patient with PD) at one or more locations (e.g., at the patient's residence, place of employment, school, etc.) using a wide variety of sensors such as, for example, physiological sensor and/or ambient sensors. The sensor data collection may provide a real-time detection of motor functions. However, given the various types of sensors/devices that are used to detect various activities, movements, or other behaviors of an entity, a need exists for efficient calibration between multiple sensors and continuous and accurate alignment of sensor tracks between sensors. That is, a need exits for time-alignment of sensor tracks from independent sensor for more efficient assessment of one or more motor systems (e.g., PD motor symptoms).

Accordingly, various embodiments are provided herein for continuous time alignment of time series data from a collection of independent sensors monitoring a common entity by one or more processors, are provided. In one embodiment, by way of example only, a method for continuous time alignment of time series data from a collection of independent sensors monitoring a common entity in an internet of things (IoT) computing environment, again by one or more processors, is provided. One or more activity events associated with a monitored entity may be identified in time series sensor data collected from a plurality of sensors. The one or more activity events may be dynamically characterized in the time series sensor data using a machine learning operation. The time series data streams from each of the plurality of sensors may be time-aligned by aligning the one or more activity events.

In an additional aspect, the present invention provides for continuous calibration of sensor tracks to provide precise analytics by eliminating manual calibration events, providing for peak matching, eliminating any requirement for mandatory communication requirement between each individual sensor or any required additional components or features (e.g., a global positioning satellite feature). In one aspect, the present invention provides for continuous time alignment of a collection of independent sensors monitoring a common entity in a computing environment. One or more activity events associated with an entity may be identified using sensor data collected from a plurality of sensors. The one or more activity events may be dynamically characterized as time series data using a machine learning operation. Each of the plurality of sensors may be time-aligned according to the one or more activity events.

In an additional aspect, the present invention identifies a sequence of activity events performed by an entity (e.g., human) using raw sensor data. The activity events may be dynamically characterized by machine learning classifiers in time series data. The sequence of activity events (characterized or output from the machine learning classifiers) may be used to time-align each independent sensor track. That is, the sensor tracks are aligned based on the activity events rather than the raw sensor data.

To further illustrate, consider the following example using two independent and different sensors located on the entity (e.g., a wrist sensor and a lumbar sensor) and the entity engages in the activity of sitting and then standing up (e.g., "sit-to-stand"). Raw data may be collected from each of the two independent and different sensors are input into a machine learning model. That is, sit-to-stand event data is collected from the wrist sensor and sit-to-stand event data is collected from the lumbar sensor.

The machine learning model may input the sit-to-stand event data from both the wrist sensor and the lumbar sensor. The machine learning model may output one or more discrete events. More specifically, the machine learning model predicts that a sit or stand event occurred at a selected period of time. In this way, the machine learning model switches from the raw data space (e.g., sit-to-stand event raw data) to the discrete events space for time series data. The predicted sit-to-stand events (e.g., the predicted events of the model) may then be used to time-align each of the two independent and different sensors located on the entity (e.g., the output events are used to time-align the sensor tracks).

Thus, the present invention enables each sensor to be time-aligned given that a sensing delay may occur between the two sensors (e.g., a sensor on a foot may detect foot movement prior to a lumbar sensor detecting movement). In this way, the sit-to-stand events are aligned using the predicted events for each independent sensor since the sit and stand movement occurs at the same time, but the sensors may be detecting the movement at different times.

It should be noted that reference to calculating or determining, the calculations or determination operations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
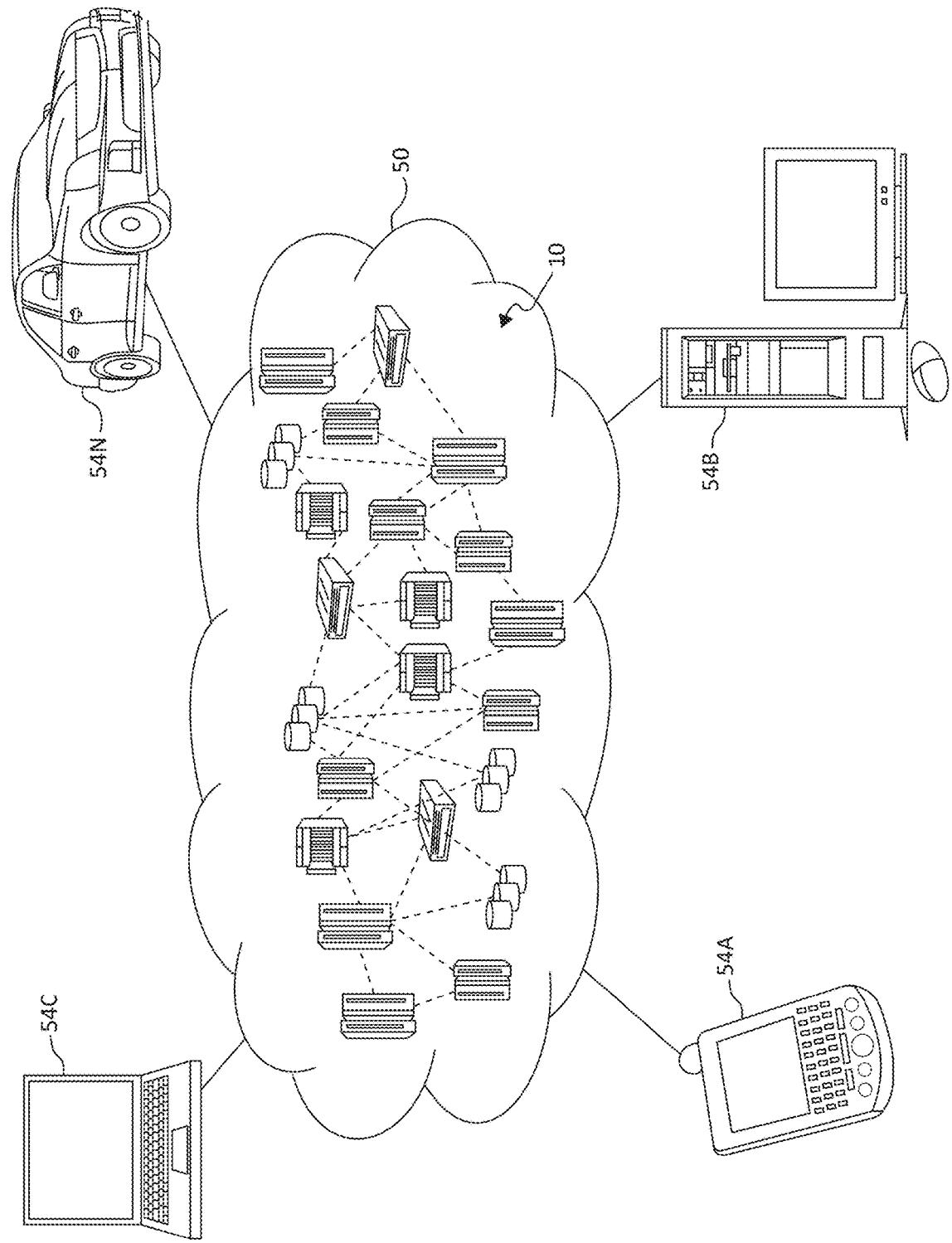
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
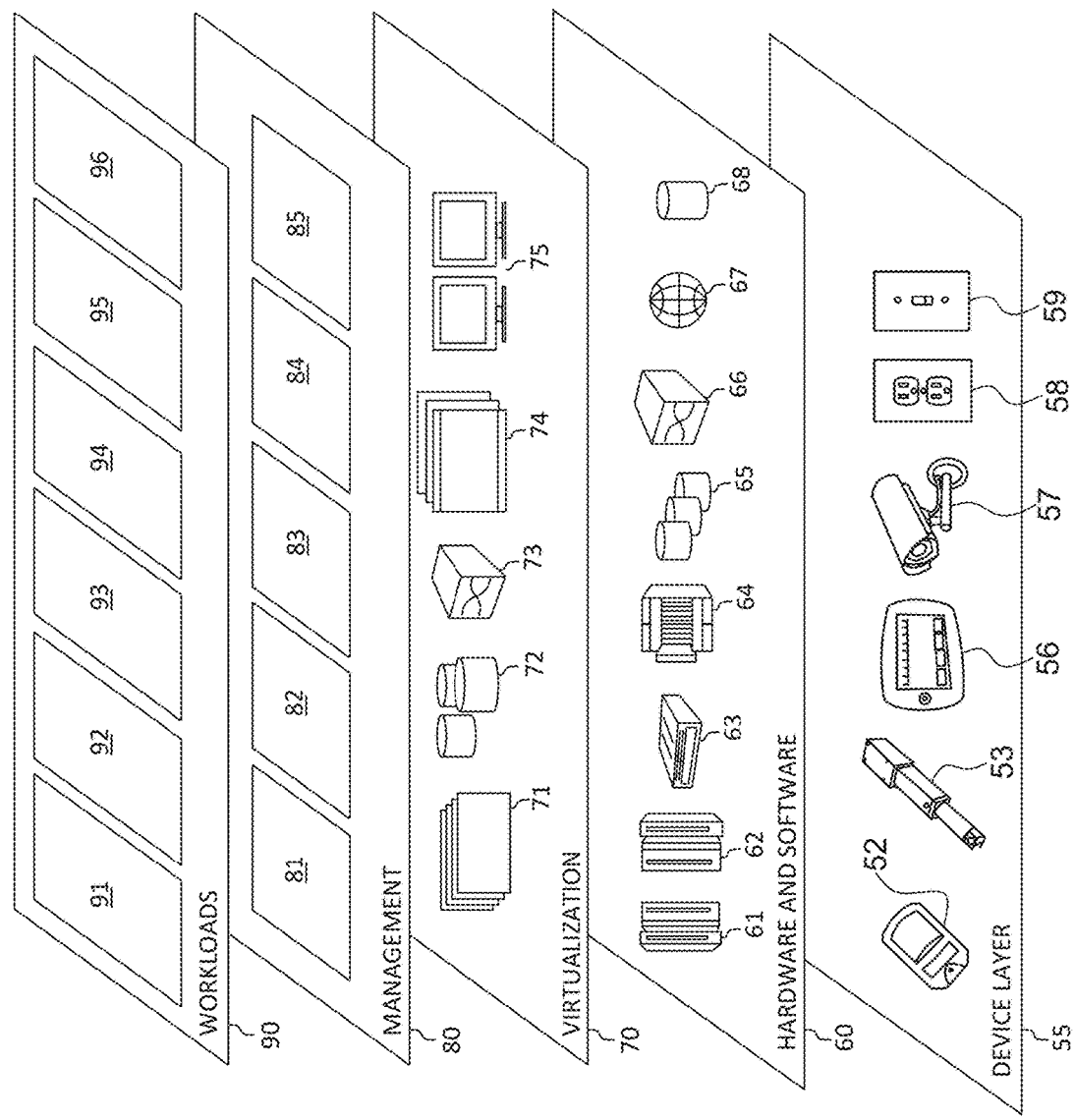
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for continuous time alignment of a collection of independent sensors monitoring a common entity. In addition, workloads and functions 96 for continuous time alignment of a collection of independent sensors monitoring a common entity may include such operations as data analytics, data analysis, and as will be further described, notification functionality. One of ordinary skill in the art will appreciate that the workloads and functions 96 for continuous time alignment of a collection of independent sensors monitoring a common entity may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for continuous time alignment of time series data from a collection of independent sensors monitoring a common entity by one or more processors, are provided. In one embodiment, by way of example only, a method for continuous time alignment of time series data from a collection of independent sensors monitoring a common entity in an internet of things (IoT) computing environment, again by one or more processors, is provided. One or more activity events associated with a monitored entity may be identified in time series sensor data collected from a plurality of sensors. The one or more activity events may be dynamically characterized in the time series sensor data using a machine learning operation. The time series data streams from each of the plurality of sensors may be time-aligned by aligning the one or more activity events.

Figure 4:
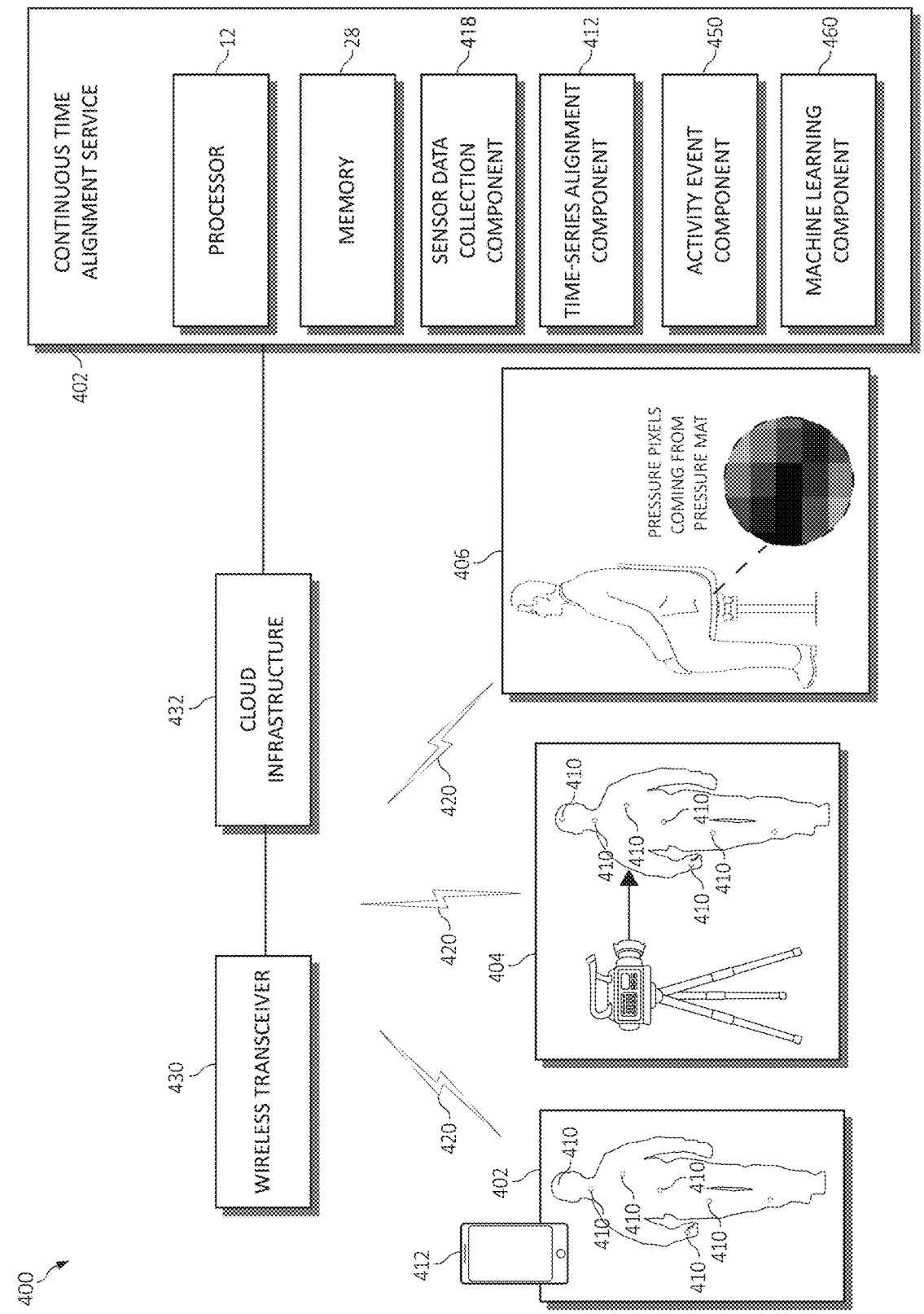
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. As shown, the various functionality, or "modules" of functionality, hardware devices, and/or other components in the same descriptive sense as has been previously described in FIGS. 1-3 may be included in FIG. 4. For example, processing unit 12 and memory 28 of FIG. 1 may be employed in FIG. 4 to perform various computational, data processing, storage and other functionality in accordance with various aspects of the present invention.

The system 400 may include functional components such as a continuous time-alignment service 402, having a sensor data collection component 418, a time-series alignment component 412, an activity event component 450, and/or a machine learning component 460, each of which may work in communication with each other.

Moreover, FIG. 4 illustrates an entity (e.g., person) 102, an audio/visual device 104 (e.g., camera, recorder, etc.), and/or object 106 that may also include one or more monitoring devices 410 (e.g., an ambient sensor). The entity 102 may include one or more monitoring devices 410 (e.g., a wearable monitoring device) that may include multiple wearable sensors that are physically coupled to the entity 102. In various examples, the monitoring devices 410 are able to include one or more of sensors that are within or attached to articles worn by the person, sensors that are attached to the person, sensors that are implanted into the person, sensors that are physically coupled to the person in any manner, or combinations of these. In an example, each monitoring devices 410 measures or determines one or more quantities associated with the person's activity. These monitoring devices 410 may be physically coupled at various selected points on the person. In some examples, one or more such monitoring devices 410 (e.g., wearable sensors) are able to measure multiple quantities, such as activities and/or movement of the user, environmental data, video data, other data, or combinations of these.

In one aspect, the multiple wearable devices 110 on each person in this example may detect, monitor, and/or measure one or more quantities. The raw data of each individual, wearable sensors 110 may be communicated a device such as, for example, device 112 (e.g., a computer, smart phone, tablet, etc.) that is on or near that person. In some examples, the device, such as the device 112, may be able to perform some processing of the data received from the wearable sensors 110.

In one aspect, the audio/visual device 404 (e.g., camera, recorder, etc.), and/or object 406 may also include one or more sensors 410 and/or be associated with one or more sensors 410. In one embodiment, the wearable devices 110, the audio/visual devices 404 (e.g., camera, recorder, etc.), and/or object 406 may each individually and/or collectively monitor, detect, or identify one or more activities (or sequence of activities), behaviors, movement of the entity 402 and/or environmental data. The raw data collected from the wearable devices 110, the audio/visual devices 404 (e.g., camera, recorder, etc.), and/or object 406 may be wirelessly transmitted via a wireless transceiver 130 via a cloud computing infrastructure to the continuous time alignment service 402.

The sensor data collection component 418 may receive, obtain, and/or collect the raw data from the wearable devices 110, the audio/visual devices 404 (e.g., camera, recorder, etc.), and/or object 406. The sensor data collection component 418, in association with the activity event component 450, may also identify one or more activities (e.g., common activities associated with one or more entities such as, for example, walking, running, standing, sitting, etc.) that entity 402 may regularly (e.g., continuous, repetitively, etc.) perform. For each of the sensors such as, for example, wearable devices 110, the audio/visual devices 404 (e.g., camera, recorder, etc.), and/or the object 406, the sensor data collection component 418 may collect labeled data for each of the identified activities.

The collected data may be used to train a machine learning classifier by the machine learning component 460 that recognizes each of the identified activities based on the labeled data.

The activity event component 450, in association with the machine learning component 460, may also track a sequence of activities, performed by an entity, using a machine learning classifier.

The time-series alignment component 412 may select a reference sensor such as, for example, one of the devices 410 on and/or associated with entity 402. One or more additional sensors (e.g., an alternative wearable device 410, audio/visual devices 404, etc.) to be aligned with the reference sensor. That is, for aligning a set of sensors (e.g., initial time-alignment and/or continuous time alignment), a reference sensor is to be selected. The reference sensor may have a reference clock for a collection of each of the independent sensors (e.g., all other sensors will be time-aligned with respect to the reference sensor).

The activity event component 450, in association with the machine learning component 460, may dynamically characterizing the one or more activity events as time series data using a machine learning classifier. That is, the raw data of the sensors may be input into the machine learning classifier and the output of the machine learning classifier are the one or more activity events as time series data. Said differently, the activity event component 450, in association with the machine learning component 460, may transform the sensor data (e.g., raw data) using a machine learning classifier to provide as output a continuous time series of probability activations according to a probability of each of the one or more activity events occurring in a selected time window. Also, output of the machine learning classifier may be used to align the sensors (e.g., an alternative wearable device 410, audio/visual devices 404, etc.) with the reference sensor. It should be noted that the machine learning component 460 may be a machine learning classified.

Returning now to the time-series alignment component 412, the time-series alignment component 412 may time-align each of the plurality of sensors according to the one or more activity events. More specifically, the time-series alignment component 412 may identify a lag (e.g., time lag) and obtain an optimal or selected cross correlation between the continuous time series of probability activations (e.g., output of the machine learning outputs), as illustrated in graph 604 in FIG. 6. The time-series alignment component 412 may then time-align each of the sensors with the reference sensor by shifting the time lag for each of the sensors being synchronized with the reference sensor.

In one aspect, the machine learning based models may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

Figure 5:
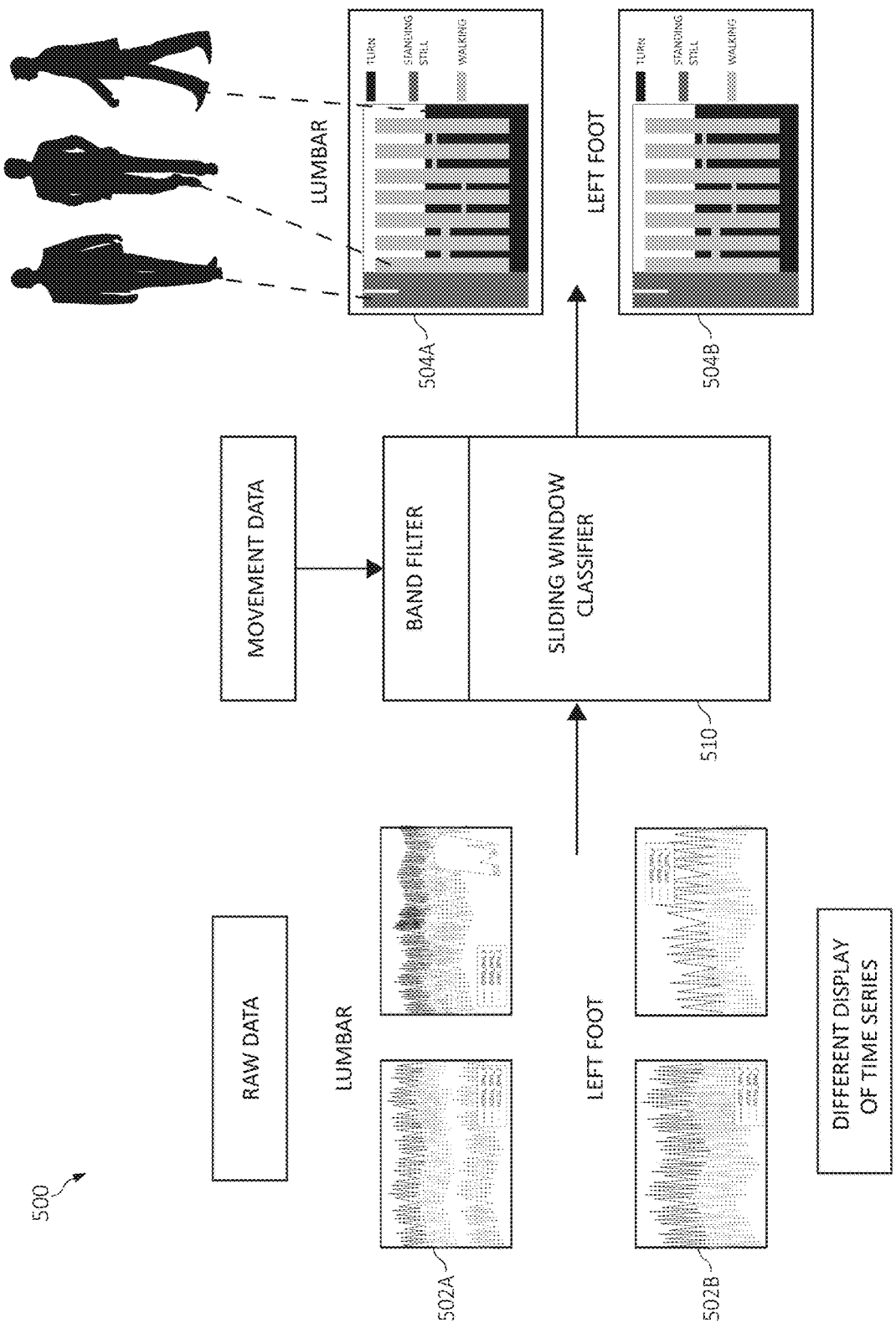
FIG. 5 is a block diagram depicting continuous time alignment of a collection of independent sensors in accordance with aspects of the present invention in which aspects of the present invention may be realized.

In view of the various embodiments described herein, consider an illustration of FIG. 5 depicting processing system 500 for continuous time alignment of a collection of independent sensors. It should be noted that the various functionality, or "modules" of functionality, hardware devices, and/or other components in the same descriptive sense as has been previously described in FIGS. 1-4 may be included in FIG. 5.

To illustrate, consider an entity (e.g., a patient) being monitored for an activity of events (e.g., turning, standing, standing still, and/or walking). A sensor, for example, attached to and/or associated with a lumbar region of the entity may collect and monitor lumbar data ("lumbar"), which is displayed on graph 502A. A sensor, for example, attached to and/or associated with a left foot may collect and monitor left foot data ("left foot"), which is displayed on graph 502B. The lumbar data depicted on graph 502A and the left foot data depicted on 502B each may be considered as raw data in a time series domain. As depicted, graph 502A and graph 502B display non-synchronized results given the placement of the sensor on the patient and the time the sensor detected the movement (e.g., a foot sensor will collect data for moving the left foot for walking prior to the lumbar sensor detecting the lumbar region movement caused by the left foot for the same activity of walking).

Thus, the movement data (e.g., the raw data) of the lumbar and the left foot may be input into a machine learning classifier 510 (e.g., a sliding window classifier). The machine learning classifier 510 may identify a sequence of activity events (e.g., turning, standing, standing still, and/or walking) performed by an entity using the raw sensor data.

The activity events may be dynamically characterized by machine learning classifiers in time series data. That is, the raw sensor data (displayed in graphs 502A and 502B) may be transformed, using the machine learning classifier 510, to produce as output a continuous time series of probability activations according to a probability of each of the one or more activity events occurring in a selected time window. The machine learning classifier 510 may then time-align each independent sensor track based on the sequence of activity events. That is, the probability of each of the one or more activity events occurring in a selected time window may be used to time-align each sensor. Said differently, the sensor tracks are time-aligned based on the activity events (rather than raw sensor data). In short, the alignment of sensors may be performed in the activity event space rather than in the raw sensor data space.

By using the machine learning classifier 510 as described, graph 504A and 504B may display the lumbar data and left foot data according to the one or more activity events as time series data dynamically characterized as the probability of each of the one or more activity events occurring in a selected time window by the sensor tracks being time-aligned based on the activity events.

Figure 6:
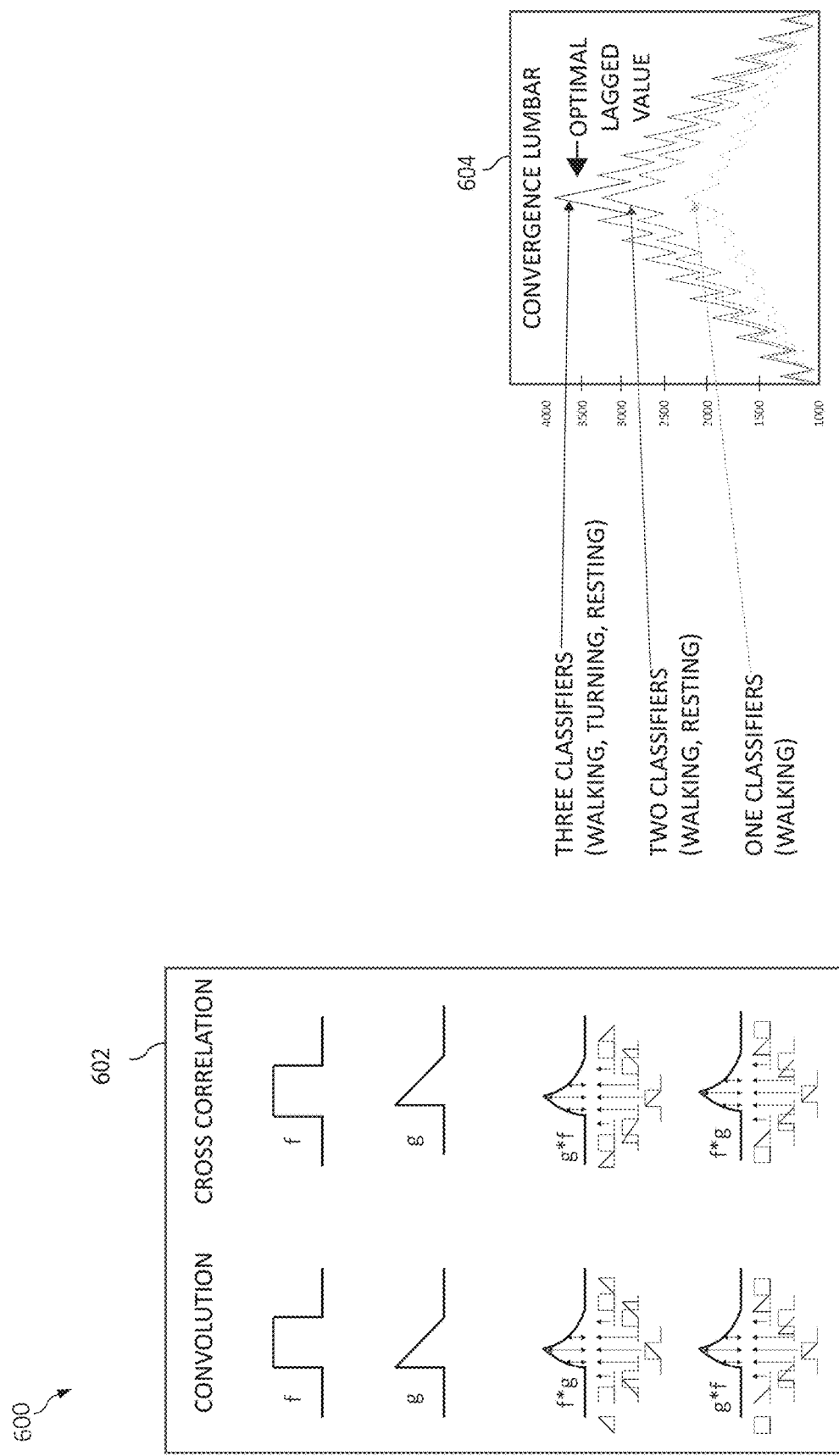
FIG. 6 are graph diagram depicting optimal cross correlation between the continuous time series of probability activations in accordance with aspects of the present invention in which aspects of the present invention may be realized.

FIG. 6 depicts altered FIG. 6 are graph diagram depicting optimal cross correlation between the continuous time series of probability activations. That is, signals "f" and "g" may be one or more operation such as, for example, convolution and/or cross-correlations 602 performed on each signal.

As mentioned previously, for time-aligning a set of sensors, a reference sensor is selected. One or more activity events of the reference sensor and one or more sensors to be aligned with the reference sensor may be dynamically characterized as time series data using a machine learning classifier. Using cross-correlation, an optimal time lag is determined between reference sensor and the one or more sensors to be aligned with the reference sensor. As the number of different activities (e.g., walking, turning, resting) that are detected increases (e.g., more sensor detecting the same sequence of activity events), the synchronization with a reference sensor increases in accuracy, as depicted in graph 604 (illustrating a convolution score in the Y-axis and the convergence of the lumbar on the X-axis.

The optimal time lag value, between similar probability activities (e.g., output of the machine learning model) representing the one or more activity events in relation to the reference sensor, is also increased. That is, graph 604 illustrates a maximum peak of the convolution score becoming sharper as more activity classifiers are added to the machine learning classifier.

Figure 7:
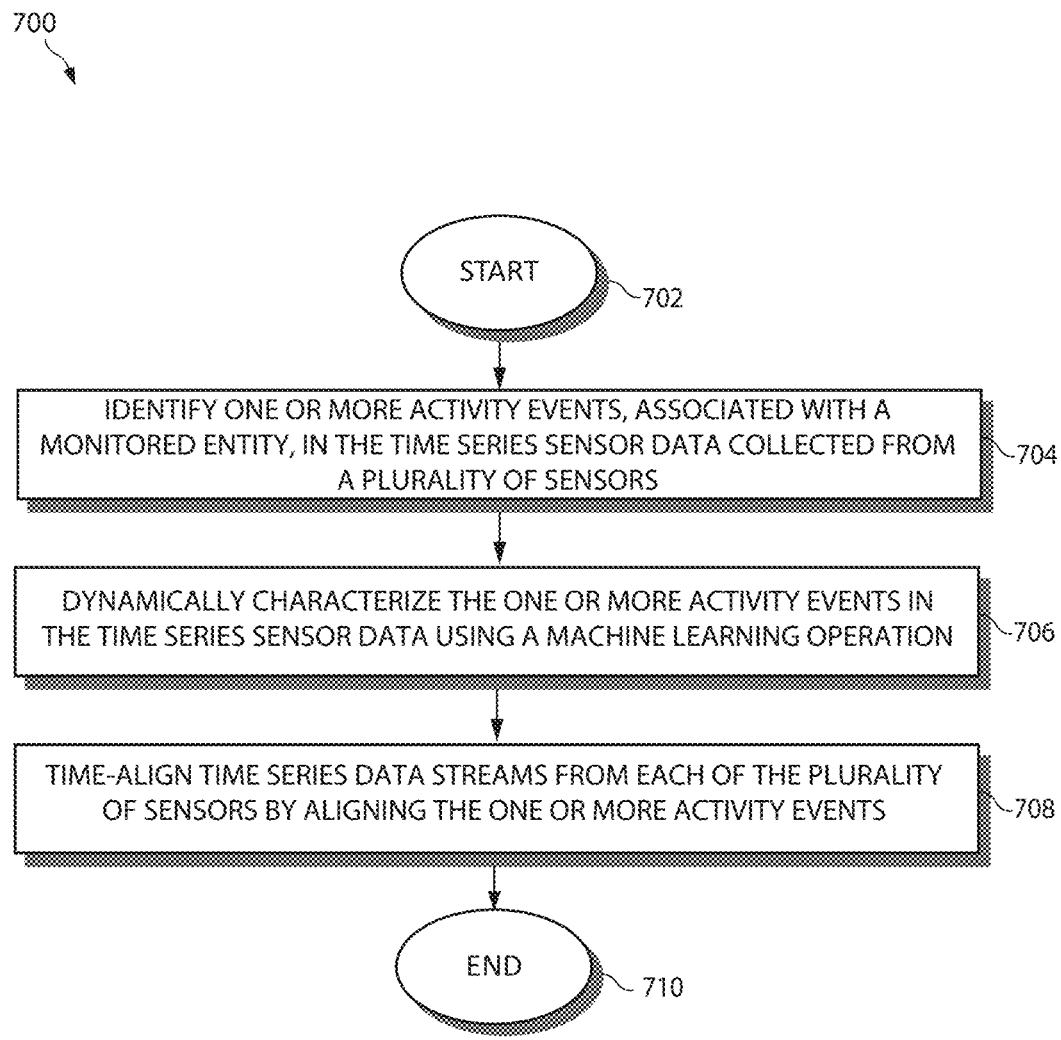
FIG. 7 is a flowchart diagram depicting an exemplary method performing continuous time alignment of a collection of independent sensors monitoring a common entity by one or more processors in which aspects of the present invention may be realized.

Turning now to FIG. 7, a conversation planner component 702 is displayed which provides a conversation planner workspace. It should be noted that the various functionality, or "modules" of functionality, hardware devices, and/or other components in the same descriptive sense as has been previously described in FIGS. 1-6 may be included in FIG. 7. For example, processing unit 12 and memory 28 of FIG. 1 may be employed in FIG. 7 to perform various computational, data processing, storage and other functionality in accordance with various aspects of the present invention.

Turning now to FIG. 7, a method 700 for medical condition communication management by one or more processors is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

One or more activity events associated with a monitored entity may be identified in the time series sensor data collected from a plurality of sensors, as in block 704. The one or more activity events may be dynamically characterized in the time series sensor data using a machine learning operation, as in block 706. The time series data streams from each of the plurality of sensors may be time-aligned by aligning the one or more activity events, as in block 708. The functionality 700 may end, as in block 710.

In one aspect, in conjunction with and/or as part of at least one block of FIG. 7, the operations of method 700 may include each of the following. The operations of method 700 may train a machine learning classifier for each of the individual sensors for predicting the one or more activity events as time series data. The sensor data (e.g., raw data) may be used in a machine learning classifier to predict the one or more activity events as time series data. A start time and an end time of each of one or more activity events predicted as time series data from a machine learning classifier. The operations of method 700 may transform the raw sensor data, using a machine learning classifier, to one or more similar probability activities representing the one or more activity events. That is, the sensor data may be transformed using a machine learning classifier (and a sliding window operation) to a continuous time series of probability activations according to a probability of each of the one or more activity events occurring in a selected time window. Pursuant to time-aligning each of the plurality of sensors, operations of method 700 may select a reference sensor of the plurality of sensors for time-aligning each of the plurality of sensors.

The operations of method 700 may determine a time lag between similar probability activities representing the one or more activity events in relation to the reference sensor. A timestamp of each of the sensors may be according to the determined time lag for time-aligning each of the plurality of sensors in relation to the reference sensor.

Figure 8:
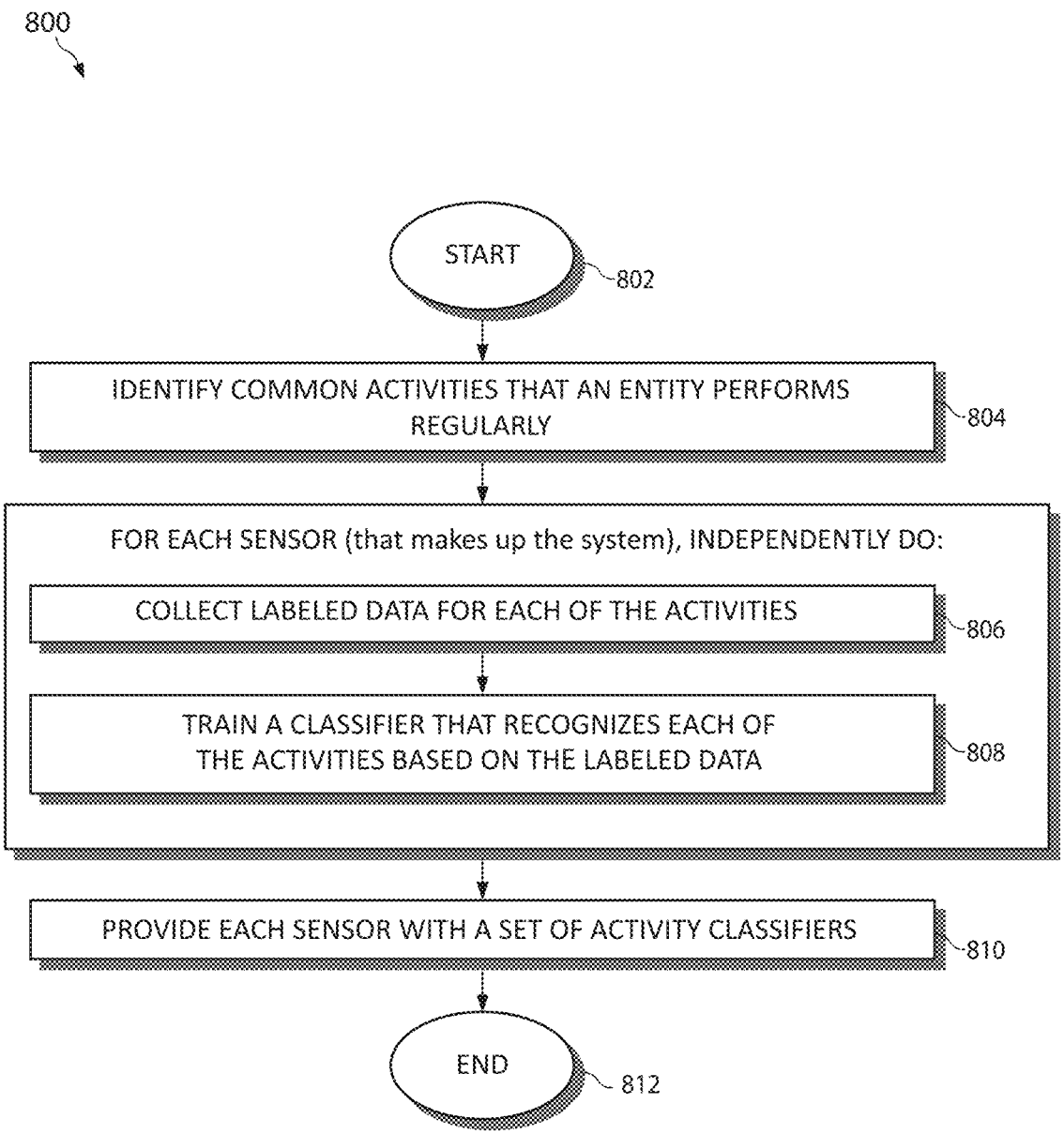
FIG. 8 is a flowchart diagram depicting an additional exemplary method performing continuous time alignment of a collection of independent sensors monitoring a common entity by one or more processors in which aspects of the present invention may be realized.

Turning now to FIG. 8, a method 800 for training a machine learning classifier for performing continuous time alignment of a collection of independent sensors monitoring a common entity by one or more processors is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

One or more activities (e.g., common activities associated with one or more entities such as, for example, walking, running, standing, sitting, etc.) that an entity regularly performs (e.g., continuous, repetitively, etc.) may be identified, as in block 804. For each sensor associated with the entity, the functionality 800 may collect labeled data for each of the identified activities, as in block 806, and also train a machine learning classifier that recognizes each of the identified activities based on the labeled data, as in block 808. Each sensor may be provided with a set of activity classifiers, as in block 810. The functionality 800 may end, as in block 812.

Figure 9:
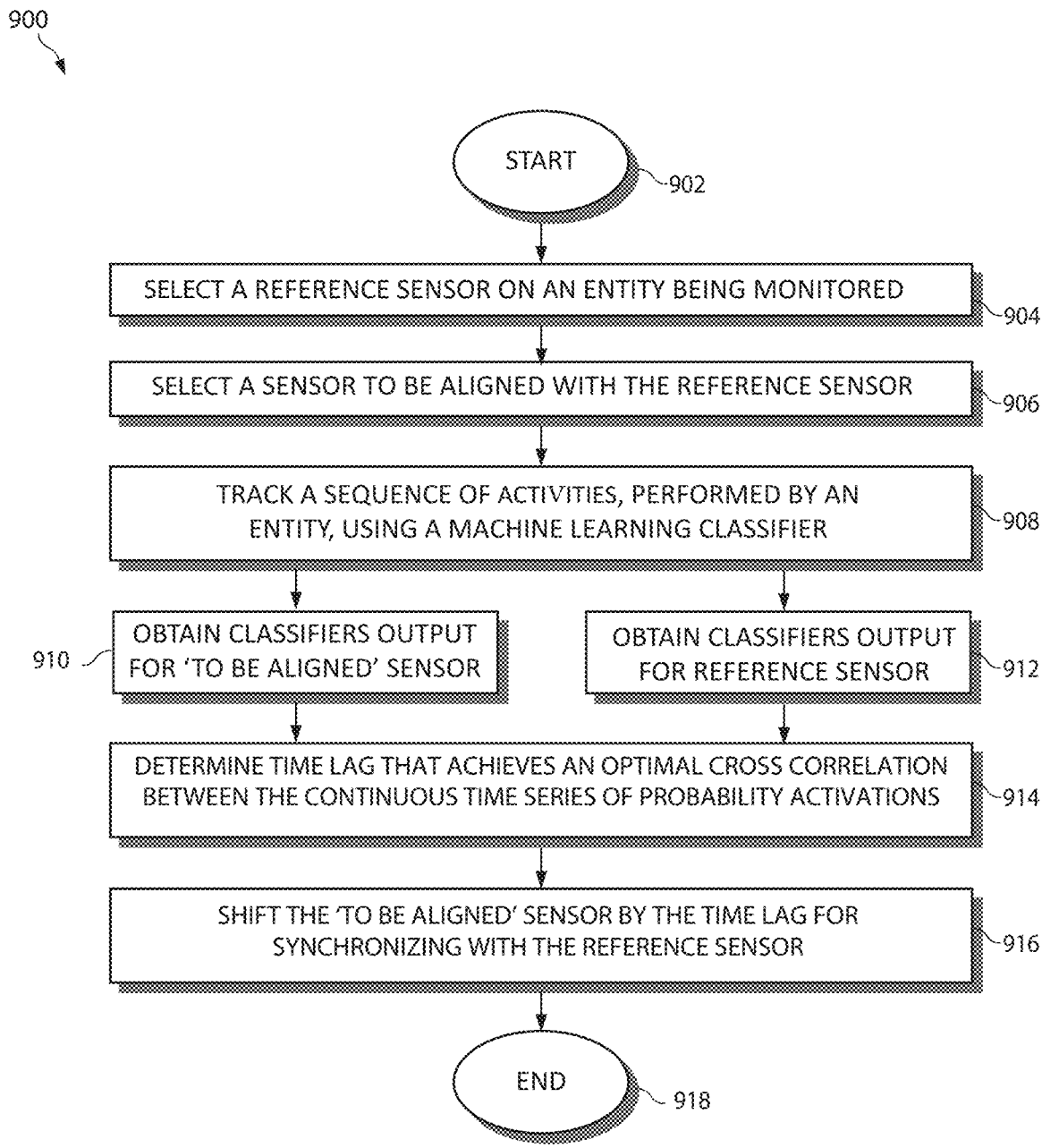

Turning now to FIG. 9, a method 900 for continuous time alignment of a collection of independent sensors monitoring a common entity by one or more processors is depicted, in which various aspects of the illustrated embodiments may be implemented. The functionality 900 may be implemented as a method executed as instructions on a machine, where the instructions are included on at least one computer readable medium or one non-transitory machine-readable storage medium. The functionality 900 may start in block 902.

A reference sensor may be selected (e.g., chosen) on an entity (e.g., a human, object, etc.) being monitored, as in block 904. A sensor may be selected to be aligned with the reference sensor, as in block 906. A sequence of activities, performed by an entity, may be tracked using a machine learning classifier, as in block 908. From block 908, an output of machine learning classifiers may be obtained for those sensors that are to be aligned with the reference sensor (e.g., 'to be aligned' sensors) may be obtained, as in block 910. Also, from block 908 (which may be performed sequentially and/or in parallel with block 910), an output of machine learning classifiers for the reference sensor may be obtained, as in block 912.

A lag (e.g., time lag) may be identified that obtains an optimal cross correlation between the continuous time series of probability activations (e.g., output of the machine learning outputs) may be determined, as in block 914. Each of the sensors that are to be aligned (e.g., 'to be aligned' sensors) with the reference sensor may be shifted by the time lag for being synchronized with the reference sensor, as in block 916. The functionality 900 may end, as in block 918.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for continuous time alignment of time series data from a collection of independent sensors by one or more processors, comprising:
    identifying one or more activity events, associated with a monitored entity, in the time series sensor data collected from a plurality of sensors;
    dynamically characterizing the one or more activity events in the time series sensor data using a machine learning operation; and
    time-aligning time series data streams from each of the plurality of sensors by aligning the one or more activity events such that the time series data streams from each of the plurality of sensors is time-aligned utilizing only output of the machine learning operation characterizing the one or more activity events and irrespective of raw sensor data contained in the time series sensor data, wherein the time series data streams are each independent of one another such that the time series data streams from each of the plurality of sensors are time-aligned notwithstanding whether any of the plurality of sensors had any network communication during a collection of the time series sensor data of the monitored entity.

2. The method of claim 1, further including training a machine learning classifier for each of the plurality of sensor for predicting the one or more activity events as the time series data.

3. The method of claim 1, further including using the time series sensor data in a machine learning classifier to predict the one or more activity events as the time series data.

4. The method of claim 1, further including defining a start time and an end time of each of one or more activity events predicted as the time series data from a machine learning classifier.

5. The method of claim 1, further including transforming the time series sensor data using a machine learning classifier to a continuous time series of probability activations according to a probability of each of the one or more activity events occurring in a selected time window.

6. The method of claim 1, wherein time-aligning each of the plurality of sensors further includes selecting a reference sensor of the plurality of sensors for time-aligning each of the plurality of sensors.

7. The method of claim 6, further including:
    determining a time lag between similar probability activities representing the one or more activity events in relation to the reference sensor; and
    shifting a timestamp of each of the plurality of sensors according to the determined time lag for time-aligning each of the plurality of sensors in relation to the reference sensor.

8. A system for continuous time alignment of time series data from a collection of independent sensors, comprising:
    one or more computers with executable instructions that when executed cause the system to:
        identify one or more activity events, associated with a monitored entity, in the time series sensor data collected from a plurality of sensors;
        dynamically characterize the one or more activity events in the time series sensor data using a machine learning operation; and
        time-align time series data streams from each of the plurality of sensors by aligning the one or more activity events such that the time series data streams from each of the plurality of sensors is time-aligned utilizing only output of the machine learning operation characterizing the one or more activity events and irrespective of raw sensor data contained in the time series sensor data, wherein the time series data streams are each independent of one another such that the time series data streams from each of the plurality of sensors are time-aligned notwithstanding whether any of the plurality of sensors had any network communication during a collection of the time series sensor data of the monitored entity.

9. The system of claim 8, wherein the executable instructions further train a machine learning classifier for each of the plurality of sensor for predicting the one or more activity events as the time series data.

10. The system of claim 8, wherein the executable instructions further use the time series sensor data in a machine learning classifier to predict the one or more activity events as the time series data.

11. The system of claim 8, wherein the executable instructions further define a start time and an end time of each of one or more activity events predicted as the time series data from a machine learning classifier.

12. The system of claim 8, wherein the executable instructions further transform the time series sensor data using a machine learning classifier to a continuous time series of probability activations according to a probability of each of the one or more activity events occurring in a selected time window.

13. The system of claim 8, wherein, pursuant to time-aligning each of the plurality of sensors, the executable instructions further select a reference sensor of the plurality of sensors for time-aligning each of the plurality of sensors.

14. The system of claim 13, wherein the executable instructions further:
    determine a time lag between similar probability activities representing the one or more activity events in relation to the reference sensor; and
    shift a timestamp of each of the plurality of sensors according to the determined time lag for time-aligning each of the plurality of sensors in relation to the reference sensor.

15. A computer program product for continuous time alignment by one or more processors, the computer program product comprising a non-transitory computer-readable storage medium having computer-readable program code portions stored therein, the computer-readable program code portions comprising:
    an executable portion that identifies one or more activity events, associated with a monitored entity, in the time series sensor data collected from a plurality of sensors;
    an executable portion that dynamically characterizes the one or more activity events in the time series sensor data using a machine learning operation; and
    an executable portion that time-aligns time series data streams from each of the plurality of sensors by aligning the one or more activity events such that the time series data streams from each of the plurality of sensors is time-aligned utilizing only output of the machine learning operation characterizing the one or more activity events and irrespective of raw sensor data contained in the time series sensor data, wherein the time series data streams are each independent of one another such that the time series data streams from each of the plurality of sensors are time-aligned notwithstanding whether any of the plurality of sensors had any network communication during a collection of the time series sensor data of the monitored entity.

16. The computer program product of claim 15, further including an executable portion that:
trains a machine learning classifier for each of the plurality of sensor for predicting the one or more activity events as the time series data; and
uses the sensor data in the machine learning classifier to predict the one or more activity events as the time series data.

17. The computer program product of claim 15, further including an executable portion that defines a start time and an end time of each of one or more activity events predicted as time series data from a machine learning classifier.

18. The computer program product of claim 15, further including an executable portion that transforms the time series sensor data using a machine learning classifier to a continuous time series of probability activations according to a probability of each of the one or more activity events occurring in a selected time window.

19. The computer program product of claim 15, wherein, pursuant to time-aligning each of the plurality of sensors, further including an executable portion that selects a reference sensor of the plurality of sensors for time-aligning each of the plurality of sensors.

20. The computer program product of claim 19, further including an executable portion that:
determines a time lag between similar probability activities representing the one or more activity events in relation to the reference sensor; and
shifts a timestamp of each of the plurality of sensors according to the determined time lag for time-aligning each of the plurality of sensors in relation to the reference sensor.

* * * * *